Feb. 2, 1926.
E. E. F. D'ALBE
1,571,897
TELEGRAPHIC TRANSMISSION OF PICTURES AND IMAGES
Filed March 12, 1925
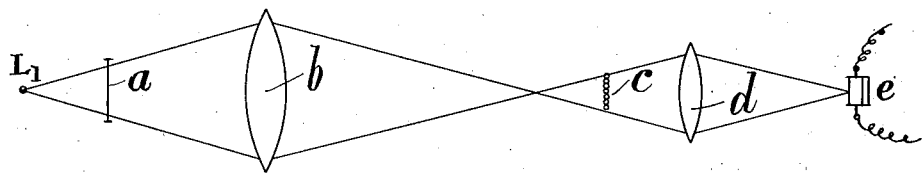
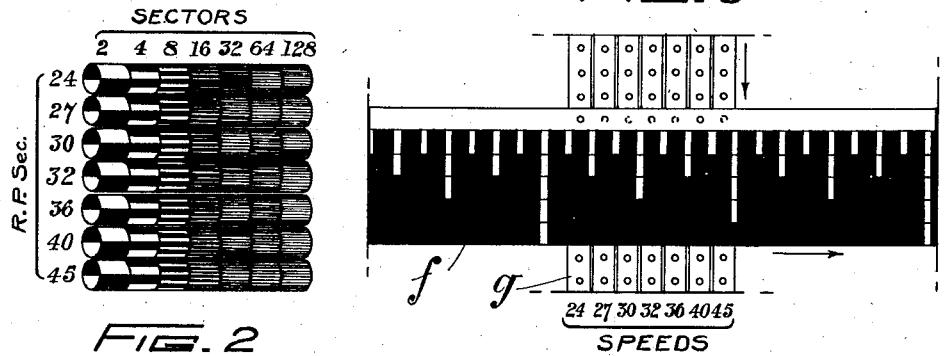
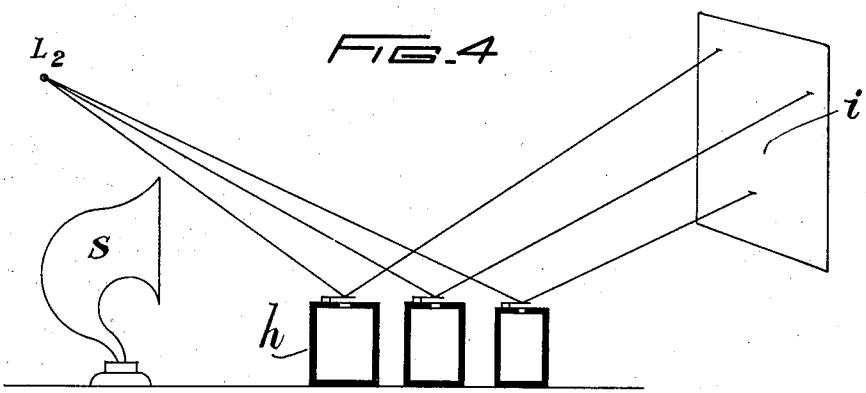

Patented Feb. 2, 1926.

1,571,897

UNITED STATES PATENT OFFICE.

EDMUND EDWARD FOURNIER D'ALBE, OF KINGSTON-ON-THAMES, ENGLAND, ASSIGNOR OF ONE-HALF TO BERNARD WINFIELD, OF NEW YORK, N. Y.

TELEGRAPHIC TRANSMISSION OF PICTURES AND IMAGES.

Application filed March 12, 1925. Serial No. 15,070.

*To all whom it may concern:*

Be it known that I, EDMUND EDWARD FOURNIER D'ALBE, a British subject, residing at Westergate House, Palace Road, Kingston-on-Thames, in the county of Surrey, England, have invented certain new and useful Improvements in Telegraphic Transmission of Pictures and Images, of which the following is a specification.

This invention relates to transmitting pictures by sound through the intermediary of wireless or by line and includes apparatus for both transmitting and reconstituting the picture.

Briefly the invention consists in general plan to assign different musical frequencies to luminous patches into which the picture or image may be divided, to convert each patch into its corresponding sound by means of selenium or other light sensitive cell or cells, to transmit the sound by ordinary telephony or by wireless telephony, and to reconstitute the picture or image at the receiving station from the sound by means of as many resonators as there are patches, each resonator responding to one note only and producing one patch in its proper place upon a screen by means of reflected light when that note is among the notes transmitted.

The invention is illustrated diagrammatically in the accompanying drawings in which:

Fig. 1 illustrates the general means of transmission.

Fig. 2 shows means for breaking the image into light impulses of different frequencies.

Fig. 3 is an alternative means for the said breaking up and

Fig. 4 shows three resonators and their relation to a source of light and a screen on which the image is projected.

Fig. 1 shows the general arrnagement for transmitting a transparent picture, which may be either a negative transparency or a positive transparency. The lenses shown may be either simple lenses or equivalent optical systems. The source of light is shown at L', the picture at $a$ and a condenser or lens at $b$. A means for breaking up the light is shown at $c$ a second lens at $d$ and the selenium cell at $e$. The device at $c$ may be either of those shown in Figs. 2 and 3 or it can be of other convenient form.

In Fig. 2, seven transparent cylinders are shown and each is divided into seven sections which are split up by opaque parts as indicated by black lines, each section having twice as many divisions as the preceding section. In the drawing the first section has two clear and two opaque sectors, the next has four clear and four opaque, the next eight and so on, the last having 128 clear sectors. These cylinders are rotated at different speeds, the first at 24 revolutions per second, the next at 27, third at 30, and the following at 32, 36, 40 and 45 respectively.

The effect of rotating each portion of the cylinders is to produce alternate brightenings and darkenings in the light transmitted across it, the brightenings occurring when the light is transmitted through two coincident transparent portions. In order to confine this action to a few definite directions, each cylinder may be enclosed in a stationary cylinder marked out in the same manner.

In Fig. 3 a strip of material $f$ is partly opaque and partly transparent as shown. This strip travels horizontally and has behind it seven opaque strips perforated at $g$. These strips travel vertically at different speeds and the openings in them register at times with the openings in the strip $f$. It will be seen that the upper edge of the strip $f$ is transparent. When the speeds of the strips are properly adjusted the strip $f$ will pick out successive octaves from the flashes furnished by the perforations $g$. Six octaves are shown in Fig. 3, thus giving a total of 42 different frequencies. But more octaves and frequencies can be added as required.

Fig. 4 shows the sound reproducer and optical arrangement at the receiving station. A source of light is seen at $L^2$ and it projects its rays onto the reeds of the resonators $h$. When sounds are emitted from the loud speaker S each of these resonators responds to its natural note only which causes its reed to vibrate and by means of a mirror on the reed to reflect the light onto the screen $i$. The relative position of the sound reproducer can vary as desired.

The reed of each resonator consists of mica or other flexible elastic substance, and is provided at its free end with a small mirror or a silvered portion. It is tuned to the fundamental note to which the resonating vessel responds. The resonating vessel, or the reed, or both, may be tilted so as to throw the beam reflected by the reed into any desired direction and onto any part of the screen $i$. The source of light $L^2$ is in the form of a bright line, so that each mirror produces a line of light on the screen $i$. These lines of light are arranged in such order as to correspond to the original patches of the picture transmitted. The screen $i$ is a white surface, but the portions where the lines of light fall are blackened. The effect of this is to show a luminous effect on the screen only when the lines of light are broadened out by the response of the reeds which produce them.

Alternatively, instead of blackening those portions which are covered by the lines of light, they may be perforated and the light may be viewed from behind the screen. A sheet of ground glass placed close behind the screen will then give a negative view of the picture transmitted.

The operation of transmitting a transparent picture is substantially as follows: The picture $a$ is illuminated by a small source of light $L'$ (Fig. 1) and its optical image is thrown on the filter $c$ by the lens $b$. The lens $d$ collects all the light rendered intermittent by the filter $c$ and projects it onto the selenium cell $e$. This medley of electrical impulses produced in the selenium is converted into sound by any of the methods usual for this purpose. The sound is transmitted by ordinary telephony or radiotelephony and reproduced at the receiving station by any of the methods already practised.

Alternatively, electrical impulses produced in the selenium may be made to act upon the grid of a wireless transmitting valve, in which case there is no necessity to convert them into sound before transmission, such conversion being carried out at the receiving station only.

A slight modification of this invention may be used for transmitting images of landscapes or solid objects. In this modification, the source of light $L'$ is omitted, and an optical image of the object or landscape is produced by the lens $b$ on the filter $c$.

The different tone values or variations in transparency of the original picture correspondingly affect the intensity of the light passing to the filter $c$ which in its turn affects the intensity of the different electrical impulses resulting from the projection of these lights onto the selenium cell and since the intensity of the sound at the receiving station is dependent upon that of the electrical impulses it will be understood that upon these sounds being analyzed by the resonators, the reeds of same will vibrate more or less according to the intensity of their fundamental sounds and more or less light will be reflected by the white parts of the screen according to the amount the pencils of light broaden and thus variations of tone of the original will be reproduced.

In the alternative method, in which a perforated screen is used at the receiving station, the amount of light transmitted through each perforation varies according to the width to which its vibrating pencil of light is broadened out since only the central portion of the broadened pencil is transmitted through each perforation. The amount of light thus transmitted makes a patch on the ground glass behind the screen, and the brightness of that patch varies inversely as the loudness of the note which broadens out its corresponding pencil of light.

What I claim is:—

1. An apparatus for the reproduction of pictures or images by television, including resonators, each responsive to a natural note and a reed vibrating with the resonator and having a light-reflecting surface.

2. An apparatus for the reproduction of pictures or images by television, including resonators each responsive to a natural note, and a reed carried by each resonator and responsive in vibration to the note of the particular resonator, a portion of the surface of each reed being light reflecting.

In testimony whereof I affix my signature.

EDMUND EDWARD FOURNIER d'ALBE.